Jan. 21, 1941.  J. A. BROCKMEYER  2,229,040
PISTON CONSTRUCTION
Filed Feb. 6, 1940  2 Sheets-Sheet 1
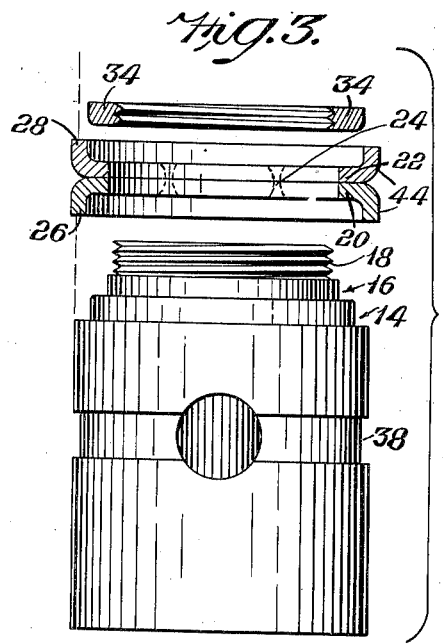
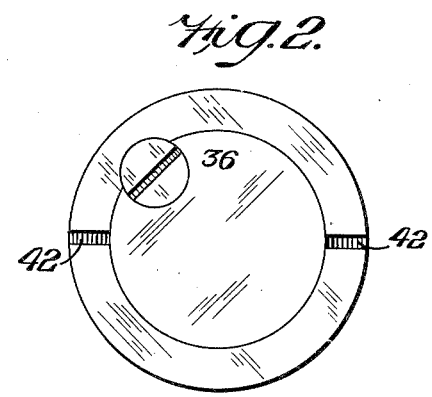
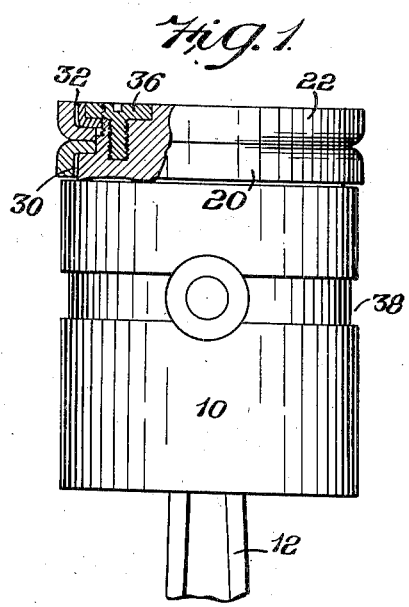
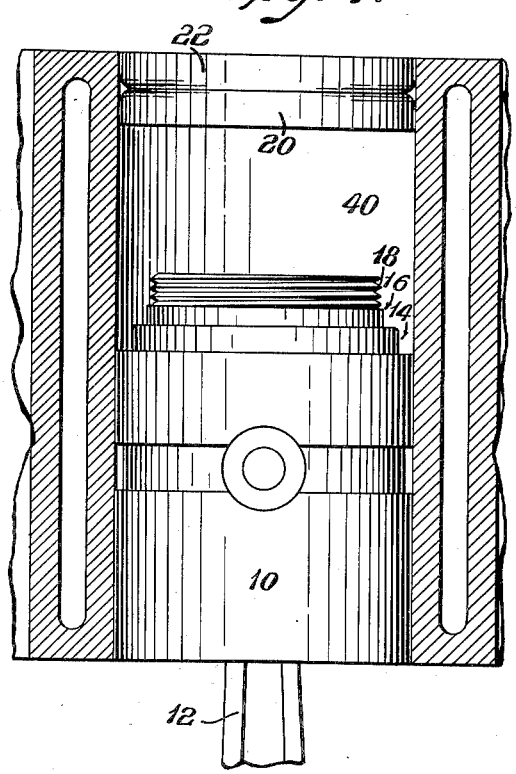
INVENTOR
JOSEPH A BROCKMEYER
BY
Louis Nechs
ATTORNEY Jan. 21, 1941.　　　J. A. BROCKMEYER　　　2,229,040
PISTON CONSTRUCTION
Filed Feb. 6, 1940　　　2 Sheets-Sheet 2
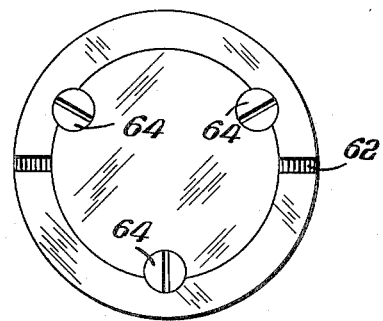
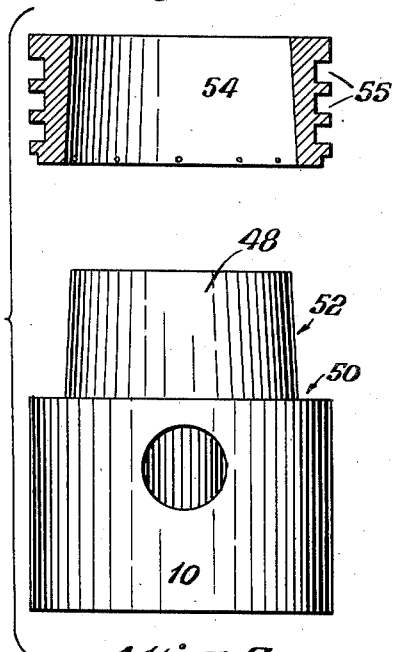
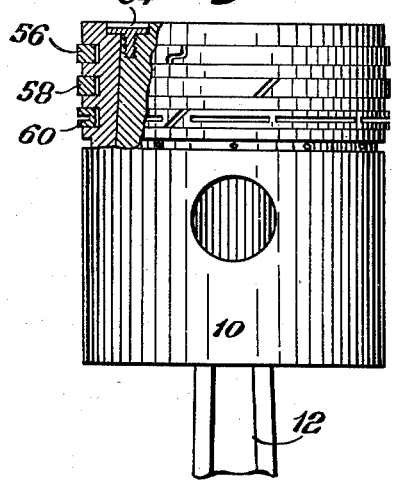
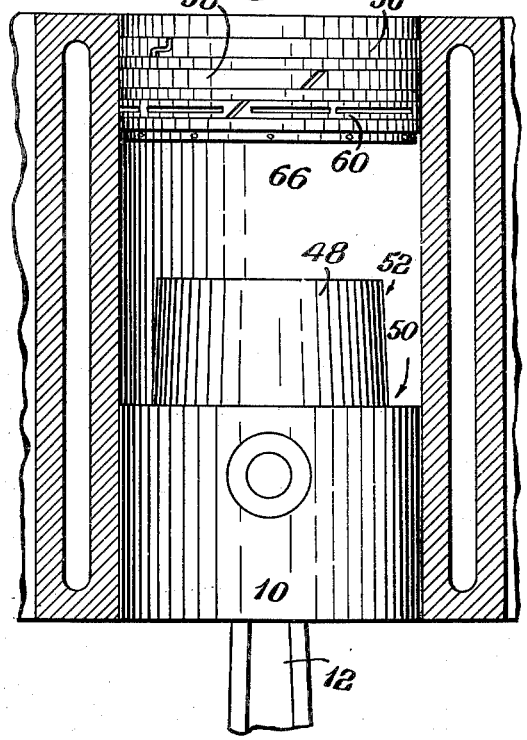
INVENTOR
JOSEPH A. BROCKMEYER
BY
Louis Necho
ATTORNEY Patented Jan. 21, 1941

2,229,040

UNITED STATES PATENT OFFICE 2,229,040

PISTON CONSTRUCTION

Joseph A. Brockmeyer, Upper Darby, Pa., assignor to Rose M. Brockmeyer, Upper Darby, Pa.

Application February 6, 1940, Serial No. 317,462

1 Claim. (Cl. 309—14)

My invention relates to a new and useful piston construction which is particularly designed for use in combustion engines but which can also be used in connection with pumps or wherever a piston reciprocates within a cylinder, the primary object being to so construct the piston as to facilitate the removal of wearing rings usually forming part of the piston and other objects being to reduce the wearing action of the piston on the cylinder wall, to provide a tight construction which would prevent leakage of compression in one direction and passage of excess oil in the other direction, and finally so to construct the piston and its adjuncts as to reduce the costs and render the same capable of mass production.

Other objects and novel features of my invention, and the method of carrying out the same will be more clearly understood from the following specification and the accompanying drawings in which:

Fig. 1 represents a view, partly in side elevation and partly in section, of a piston embodying my invention.

Fig. 2 represents a top plan view of Fig. 1.

Fig. 3 represents a composite view, partly in elevation and partly in section, showing the various parts before they are assembled.

Fig. 4 represents a view, partly in elevation and partly in section, showing the piston in the cylinder with the wearing rings of the piston detached from the body of the piston proper.

Fig. 5 represents a view similar to Fig. 1 showing a modified form of construction.

Fig. 6 is a top plan view of Fig. 5.

Fig. 7 represents a view similar to Fig. 3 illustrating the modified construction of Fig. 5.

Fig. 8 represents a view similar to Fig. 4 illustrating the modified construction of Fig. 5.

Referring to the drawings in which like reference characters indicate like parts, and more particularly to Figs. 1 to 4, 10 represents the body of a piston and 12 designates the usual connecting rod. In order to build a piston embodying my invention the upper portion of the piston is machined to provide the shoulders 14 and 16 and the upper, slightly reduced and threaded portion 18. I then provide the oppositely disposed dished members 20 and 22 which are preferably but not necessarily secured together in any suitable manner as at 24. The dished members 20 and 22 are made of a spring metal and they are provided with the respective rims 26 and 28 flaring slightly outwardly with respect to the perpendicular as shown by the divergence of the rims 26 and 28 with respect to the wall of the piston in Fig. 1 and as shown by the dotted line in Fig. 3. The oppositely disposed dished members 20 and 22 are assembled on the piston head in the position shown in Fig. 1 thus leaving oppositely tapered openings 30 and 32 between them and the adjacent portions of the body of the piston at the offsets 14 and 16. After the dished members 20 and 22 have been placed in position, the locking ring 34, which is internally threaded, is screwed onto the threaded portion 18 of the piston body thus clamping the dished members 20 and 22 in position and a locking screw 36 is used to prevent any possible displacement by the loosening of the ring 34 from the threaded portion 18. The body of the piston 10 is provided with the oil groove 38, the size and position of which are determined by the size of the piston and the extent to which it is desired to permit the lubricant to travel along the internal wall of the cylinder 40 in which the piston reciprocates. When the piston is completely assembled as shown in Fig. 1, a clamping tool is used to compress the rims 26 and 28 of the dished members 20 and 22 and in this way the piston is inserted downwardly into the cylinder 40. After being released from the clamping tool, the spring rims 26 and 28 tend to resume their original position and thus they form a perfect fit against the wall of the cylinder. When it is desired to replace the detachable parts shown in Fig. 3 due to wear or other damage, it is merely necessary to remove the screw 36 whereupon the ring 34 is unscrewed by use of a spanner wrench engaging the slots 42. While unscrewing the ring 34, the dished members 20 and 22 are also loosened so as to break any adhesive bond that may have developed between them and the body of the piston. The crank shaft is then turned to lower the piston as shown in Fig. 4 thus leaving the dished members 20 and 22 near the top of the cylinder 40. Thereupon they can be withdrawn upwardly and when it is desired to apply new parts the piston 10 is again raised to its uppermost position by turning the crank shaft and new members 20 and 22 are placed in position and locked by the same ring 34 and the same screw 36. As will be seen from Fig. 4, when the dished members 20 and 22 are within the cylinder 40, their outer surfaces 44 form plain vertical surfaces which present a relatively large bearing area against the wall of the cylinder 40 thus reducing the wear that would result from the use of a plurality of relatively narrow split rings the upper and lower rims of which act as cutting tools against the wall of the cylinder.

In practice it has been found that when a split ring of any known conventional make is used for an appreciable time it wears out primarily along its upper and lower rims so that the exterior surface of the ring is no longer rectilinear but is curved or convexed. When that happens there will be leakage along the upper and lower ends of the curved exterior wall of the ring which leakage will by-pass behind the split spring which, in order to perform its function, must be spaced away from its seat in the body of the piston. Furthermore, in the process of wearing away the upper and lower edges of the exterior wall of the ring the cylinder wall is accordingly worn down. Furthermore, in the use of conventional split rings it is impossible to prevent compression leakage due to the fact that on the compression stroke the mixture drawn into the cylinder tends to flow behind the rings or between the inner walls of each ring and the body of the piston and then between the wall of the piston and the wall of the cylinder at the areas intermediate the series of rings used and similarly the lubricant from the crank case can also find its way up to the top of the piston following the same path thus causing the engine to burn oil and causing the formation of carbon deposits. By my construction, as will be clearly seen from the left hand upper portion of Fig. 1, the exterior wall or bearing surface 44 of the oppositely disposed dished members 20 and 22 are tight against the cylinder wall, and, inasmuch as their inner annular portions seat and fit tightly in the offsets 14 and 16 there can be no leakage between the contiguous portions of the dished members 20 and 22 and the surfaces of the body of the piston at the offsets 14 and 16. Furthermore, on the compression stroke of the piston in the cylinder 40 the charge is unable to leak or seep down into the crank case. On the contrary the charge enters the annular space 32 and thus tends to push the rim 28 of the dished member 22 outwardly against the wall of the cylinder 40 thus insuring tightness even if the contiguous parts have worn down somewhat. Also, on the compression stroke the rim 26 of the lower dished member 20 has at all times a tight fit with the cylinder thus preventing seepage of the oil upwardly to the combustion chamber above the piston top. According to this construction the oil reaching the groove 38 cannot go any further towards the top of the piston except by lapping action of the portion of the piston 10 above the groove 38. For this purpose the size and position of the groove 38 can be adjusted by experiment until the exact position has been reached which would permit sufficient lubrication of the cylinder wall without seepage of excess oil.

In the drawings I have shown the dished members 20 and 22 as having the rims 26 and 28 of a certain depth, vertically considered, but I wish to point out that it is within the scope of my invention to increase or decrease the length of the vertical rims 26 and 28 to increase the bearing surface presented by the exterior walls thereof as well as to control and regulate the flow of the lubricant. Also, it is within the scope of my invention to use two sets of dished members 20 and 22 superimposed above each other on the top of the piston.

In Figs. 5 to 8 I have shown a modified form of construction in which the upper portion 48 of the piston 10 is offset as at 50 and the vertical wall 52 thereof tapers slightly towards the top of the piston. I then utilize the correspondingly tapered sleeve 54 in the outer surface of which are machined the seats or recesses 55 which are adapted to receive conventional split rings 56, 58 and 60 each of which may be of a different construction as shown in Fig. 8 or which may all be of the same design. The sleeve 54 is also provided with the slots 62 which are adapted to engage a spanner wrench which is used in order to loosen the sleeve 54 from the tapered, reduced portion 48 of the piston after the locking screws 64 have been removed. When it is necessary to replace the rings 56, 58 or 60, or any of them, it is merely necessary to remove the locking screws 64 and, by a spanner wrench, rock the sleeve to loosen it from the piston body whereupon the piston is lowered and the sleeve 54 with the rings carried thereby is lifted from the top of the cylinder. When new rings have been fitted they are again held by a clamping tool to compress them into their recesses 55 and the sleeve 54 is then inserted over the tapered portion 48 of the piston and locked in position. This construction is calculated to impart the feature of easy and inexpensive replacement of the conventional rings to present-day constructions of conventional pistons without the necessity of re-tooling as far as the recesses 55 of the rings are concerned, it only being necessary to form the upper portion 48 and the sleeve 54. In this construction I may employ the conventional openings 66 for permitting the passage of lubricant in the conventional manner.

If the recesses 55 in the sleeve 54 should wear out due to the action of the rings therein, I can, instead of simply renewing or replacing the rings, use a new sleeve 54.

Having thus described my invention, what I claim as new and desire to secure by Letters Patent is:

A piston for an internal combustion engine comprising, a lower portion of substantially the same diameter as the diameter of the cylinder in which the piston is to reciprocate, an upper threaded portion of a reduced diameter, and a stepped portion intermediate said threaded portion and said lower portion whereby two annular, inwardly-recessed shoulders are formed one above the other, with the lower of said shoulders of a greater diameter than the upper shoulder, and with the upper shoulder of substantially the same diameter as said upper threaded portion, an integral lower collar of the same width as the width of and adapted to seat on said lower shoulder, said collar having a downwardly-extending resilient integral flange of a height substantially equal to the height of said lower shoulder, an upper collar of the same dimensions as and adapted to seat on said lower collar, said upper collar having an upwardly-extending resilient integral flange, the upper edge of said flange being flush with the upper edge of said threaded portion and an integral threaded ring of a thickness equal to the thickness of said upper threaded portion, said ring being adapted to engage said threaded portion and to seat within said upper flange to clamp said collar in position.

JOSEPH A. BROCKMEYER.